(12) United States Patent
Noh et al.

(10) Patent No.: US 11,870,105 B2
(45) Date of Patent: Jan. 9, 2024

(54) PLANAR SOLID OXIDE FUEL CELL

(71) Applicant: LG CHEM, LTD., Seoul (KR)

(72) Inventors: Tai Min Noh, Daejeon (KR);
Sanghyeok Im, Daejeon (KR);
Yeonhyuk Heo, Daejeon (KR);
Kwangyeon Park, Daejeon (KR);
Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 216 days.

(21) Appl. No.: 16/255,539

(22) Filed: Jan. 23, 2019

(65) Prior Publication Data

US 2019/0157689 A1 May 23, 2019

Related U.S. Application Data

(63) Continuation of application No. PCT/KR2017/008898, filed on Aug. 16, 2017.

(30) Foreign Application Priority Data

Aug. 16, 2016 (KR) .......................... 10-2016-0103727

(51) Int. Cl.
| | | |
|---|---|---|
| *H01M 8/00* | (2016.01) | |
| *H01M 8/1226* | (2016.01) | |
| *H01M 8/0271* | (2016.01) | |
| *H01M 8/12* | (2016.01) | |
| *H01M 8/2432* | (2016.01) | |
| *H01M 4/86* | (2006.01) | |
| *H01M 4/88* | (2006.01) | |
| *H01M 8/0258* | (2016.01) | |
| *H01M 8/2483* | (2016.01) | |

(52) U.S. Cl.
CPC ......... *H01M 8/006* (2013.01); *H01M 4/8626* (2013.01); *H01M 4/8892* (2013.01); *H01M 8/0258* (2013.01); *H01M 8/0271* (2013.01); *H01M 8/1226* (2013.01); *H01M 8/2432* (2016.02); *H01M 8/2483* (2016.02); *H01M 2008/1293* (2013.01)

(58) Field of Classification Search
CPC .. H01M 8/006; H01M 4/8626; H01M 4/8892; H01M 8/0258; H01M 8/0271; H01M 8/1226; H01M 8/2432; H01M 8/2483; H01M 2008/1293
See application file for complete search history.

(56) References Cited

U.S. PATENT DOCUMENTS

| | | |
|---|---|---|
| 9,806,360 B2 | 10/2017 | Yu et al. |
| 9,831,517 B2 | 11/2017 | Yu et al. |

(Continued)

FOREIGN PATENT DOCUMENTS

| | | |
|---|---|---|
| CN | 101006598 A | 7/2007 |
| CN | 101034753 A | 9/2007 |

(Continued)

OTHER PUBLICATIONS

JP-5716613-B2—Machine Translation (Year: 2013).*

(Continued)

*Primary Examiner* — Brian R Ohara
*Assistant Examiner* — Patrick Marshall Greene
(74) *Attorney, Agent, or Firm* — Birch, Stewart, Kolasch & Birch, LLP

(57) ABSTRACT

A planar type solid oxide fuel cell, and more particularly, a thin and light planar type solid oxide fuel cell omits a window frame and has a simplified a unit cell having a through hole through which fuel and air flow in/out a fuel electrode.

18 Claims, 4 Drawing Sheets

(56) References Cited

U.S. PATENT DOCUMENTS

| | | | |
|---|---|---|---|
| 2005/0048356 A1 | 3/2005 | Ihringer et al. | |
| 2008/0118803 A1 | 5/2008 | Dekker et al. | |
| 2010/0330457 A1 | 12/2010 | Ohmori | |
| 2012/0251917 A1 | 10/2012 | Son et al. | |
| 2013/0302717 A1 | 11/2013 | Wang et al. | |
| 2014/0147767 A1* | 5/2014 | Zerfass | H01M 8/12 429/468 |
| 2014/0342267 A1 | 11/2014 | Parihar et al. | |
| 2015/0024299 A1* | 1/2015 | Yu | H01M 8/2404 429/457 |
| 2016/0064767 A1* | 3/2016 | Yu | H01M 4/8857 429/461 |
| 2017/0309941 A1* | 10/2017 | Echigo | H01M 4/8828 |
| 2018/0034072 A1* | 2/2018 | Mizukawa | H01M 8/24 |

FOREIGN PATENT DOCUMENTS

| | | | |
|---|---|---|---|
| CN | 101355177 A | 1/2009 | |
| CN | 102738495 A | 10/2012 | |
| JP | 5-41224 A | 2/1993 | |
| JP | 7-105961 A | 4/1995 | |
| JP | 2004-200021 A | 7/2004 | |
| JP | 2012-59441 A | 3/2012 | |
| JP | 2013-54872 A | 3/2013 | |
| JP | 2013054872 A * | 3/2013 | |
| JP | 2015-511755 A | 4/2015 | |
| JP | 5716613 B2 * | 5/2015 | |
| JP | 5920880 B2 | 5/2016 | |
| KR | 10-1151868 B1 | 5/2012 | |
| KR | 10-2016-0025197 A | 3/2016 | |

OTHER PUBLICATIONS

Extended European Search Report dated Mar. 6, 2019, for European Application No. 17841671.5.
Wuillemin et al., "Modeling Of Local Cell Degradation In Solid Oxide Fuel Cells: Cumulative Effect Of Critical Operating Points", Proceedings of the 8th European Solid Oxide Fuel Cell Forum 2008, Jul. 3, 2008, pp. 1-12.
International Search Report issued in PCT/KR2017/008898 (PCT/ISA/210), dated Nov. 27, 2017.

* cited by examiner

[Figure 1]
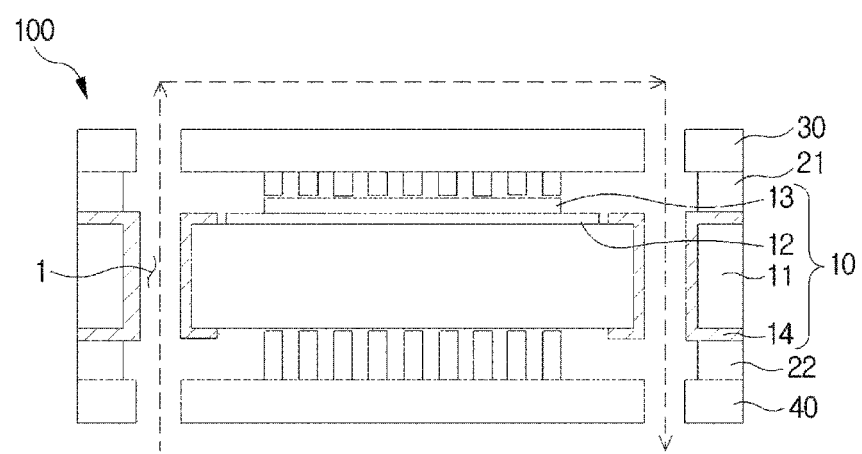

[Figure 2]
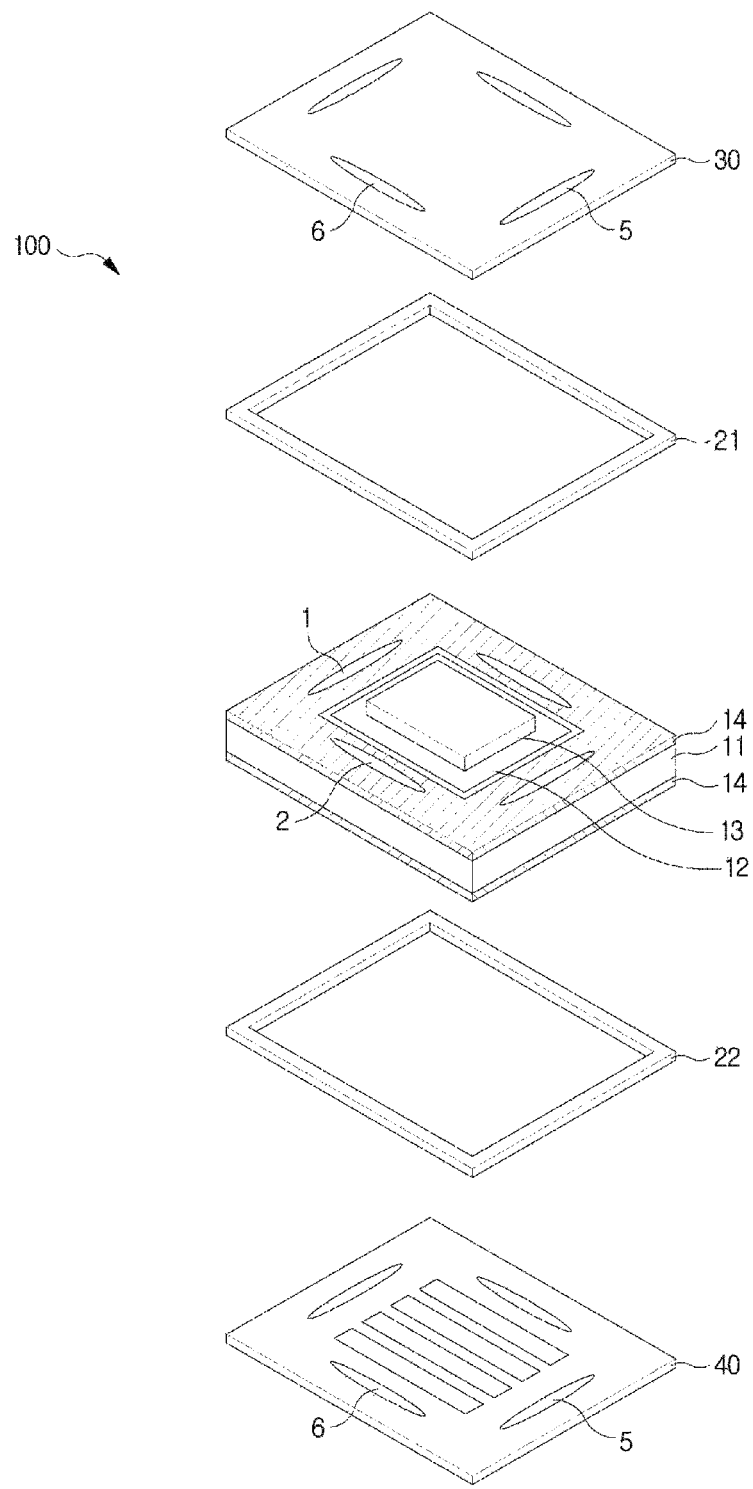

[Figure 3]
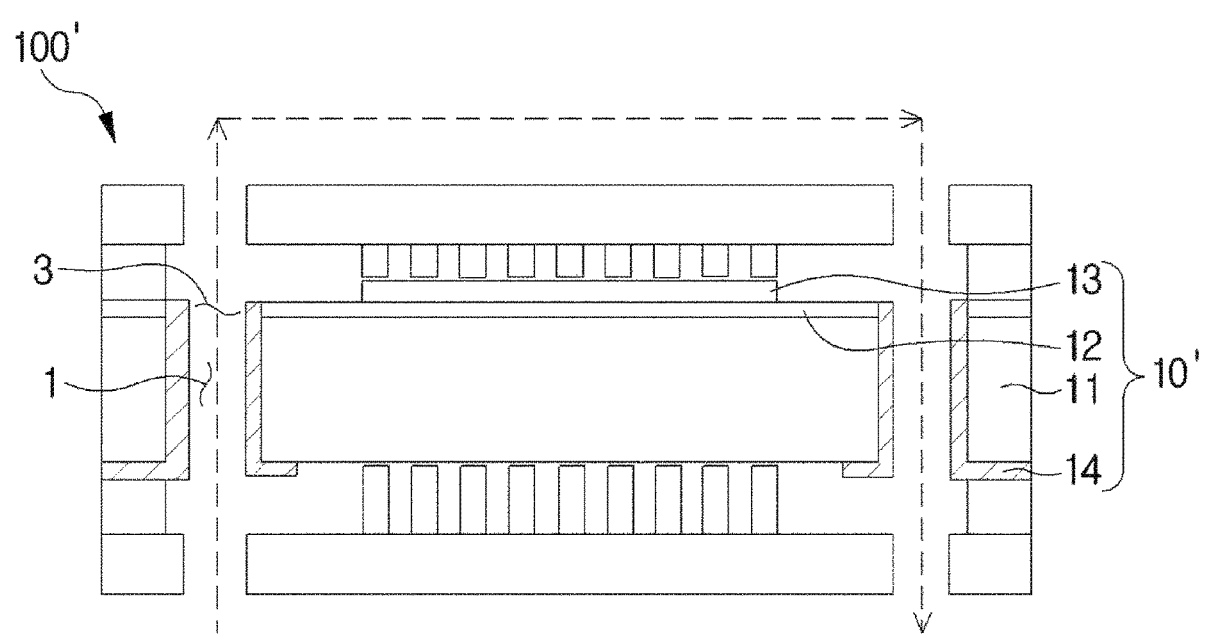

[Figure 4]
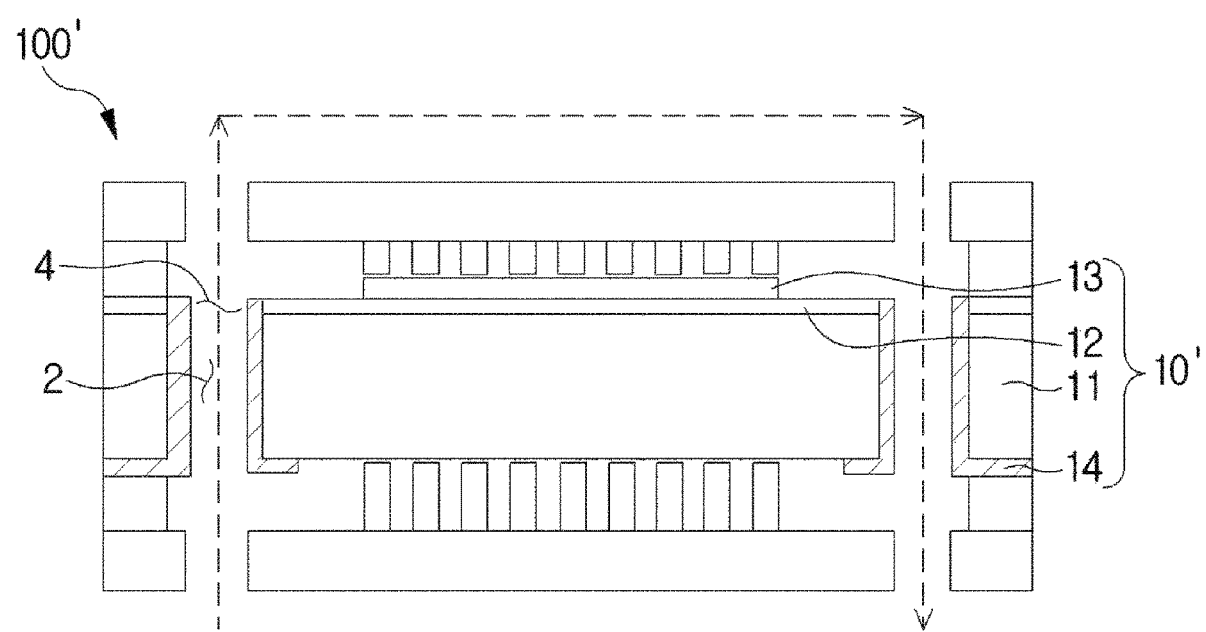

PLANAR SOLID OXIDE FUEL CELL

CROSS REFERENCE TO RELATED APPLICATIONS

This application is a Continuation of PCT International Application No. PCT/KR2017/008898, filed on Aug. 16, 2017, which claims priority under 35 U.S.C. 119(a) to Patent Application No. 10-2016-0103727, filed in the Republic of Korea on Aug. 16, 2016, all of which are hereby expressly incorporated by reference into the present application.

TECHNICAL FIELD

The present invention relates to a technology of a planar type solid oxide fuel cell, and more particularly, to a thin and light planar type solid oxide fuel cell in which a window frame is omitted and a configuration of a unit cell is simplified by forming a through hole through which fuel and air flows in a fuel electrode.

BACKGROUND ART

The fuel cell is a device which directly produces electricity through electrochemical reaction of hydrogen and oxygen in the air and is an energy source which is eco-friendly, has high energy efficiency, and has high value added through technology development. Specifically, the solid oxide fuel cell which is a third-generation fuel cell does not need to have complex external reforming system as compared with other fuel cell and does not use a noble metal electrode catalyst such as platinum, and is not corroded due to liquid electrolyte so that various operating problems caused in a low temperature fuel cell may be minimized. Further, the solid oxide fuel cell may maintain an operating temperature through appropriate insulation at the time of high temperature operating and use various fuel.

The solid oxide fuel cell is classified into a planar type and a cylindrical type depending on a shape of a unit cell. Specifically, the planar type solid oxide fuel cell may be classified into an electrolyte support-type solid oxide fuel cell, a negative electrode support-type solid oxide fuel cell, and a porous support-type solid oxide fuel cell.

The cylindrical type solid oxide fuel cell has advantages in that unit cells which configure a stack are easily sealed, resistance against thermal stress is high, and mechanical strength of the stack is high to manufacture a large area cell. However, there are problems in that a power density per unit area is low and an expensive manufacturing process is necessary.

Further, the electrolyte support-type solid oxide fuel cell has a thick electrolyte layer (having a thickness of approximately 200 μm) so that the electrolyte layer has high sheet resistance. Therefore, high operating temperature is required. Further, the porous support cell additionally uses a new material in addition to an electrode material so that a manufacturing process is more complex. Further, since the cell is configured on the same support, problems may be caused in electric connection.

Further, a weight and a volume are increased due to a window frame which is configured in a planar type solid oxide fuel cell so that additional cost may be required for processing the fuel cell. The window frame, the unit cell, and the metal may be in contact with each other in three-phase interfaces so that it is difficult to develop a sealant which may satisfactorily bond three-phase interfaces.

Therefore, in order to reduce a resistance loss of the electrolyte layer due to the thick electrolyte layer, currently, lots of studies on a fuel cell structure in which a window frame is omitted from a negative electrode support-type solid oxide fuel cell which may improve a cell performance by reducing a thickness of the electrolyte layer have been performed.

DETAILED DESCRIPTION OF THE INVENTION

Technical Problem

The present invention has been made in an effort to provide a planar type solid oxide fuel cell in which a window frame is omitted by forming a through hole through which fuel and air flow in a fuel electrode to reduce a weight and a volume of the fuel cell.

Further, the present invention has been made in an effort to provide a planar type solid oxide fuel cell in which an insulating material is coated in a fuel electrode to prevent fuel and air from being flowed into a through hole.

Technical Solution

According to an exemplary embodiment, there is provided a planar type solid oxide fuel cell, including: a unit cell which includes: a fuel electrode including at least one fuel through hole and at least one air through hole, an electrolyte layer located above the fuel electrode, an air electrode located above the electrolyte layer, and an insulating coating layer which coats at least some of a surface of the fuel electrode, the fuel through hole, and the air through hole, in which in the unit cell, the fuel electrode serves as a support.

The planar type solid oxide fuel cell may further include: a sealant layer including an upper sealant located above the unit cell and a lower sealant located below the unit cell, an air electrode interconnect which is located above the upper sealant and includes at least one air manifold and at least one fuel manifold, and a fuel electrode interconnect which is located below the lower sealant and includes at least one air manifold and at least one fuel manifold.

The fuel through hole and the air through hole may be formed at an edge of the fuel electrode.

In the electrolyte layer, a fuel gas passage corresponding to the fuel through hole and an air passage corresponding to the air through hole may be formed.

An insulating material may be coated on at least some of a surface of the electrolyte layer, the fuel gas passage, and the air passage.

The insulating coating layer may be coated with an insulating material.

The insulating material may include any one or more of yttria stabilized zirconia (YSZ), gadolinium doped cesium oxide (gadolinium stabilized ceria, GDC), calcia stabilized zirconia (CaO-stabilized ZrO2, CSZ), aluminum oxide (Al2O3), glass, and crystalized glass.

The insulating coating layer may be formed by any one of dip coating and spray coating.

The planar type solid oxide fuel cell may further include an air electrode current collector between the sealant layer and the air electrode interconnect and a fuel electrode current collector between the sealant layer and the fuel electrode interconnect.

Advantageous Effects

According to the present invention, at least one through hole is formed in a fuel electrode, so that a window frame may be omitted and a weight and a volume of the solid oxide fuel cell may be reduced.

Further, an insulating material is coated on a fuel electrode and a through hole to prevent reaction gas from penetrating into a unit cell, thereby increasing a cell generating efficiency of the fuel cell.

BRIEF DESCRIPTION OF DRAWINGS

FIG. 1 is a cross-sectional view of a planar type solid oxide fuel cell according to an exemplary embodiment of the present invention.

FIG. 2 is an exploded perspective view of a planar type solid oxide fuel cell according to an exemplary embodiment of the present invention.

FIG. 3 is a cross-sectional view of a planar type solid oxide fuel cell according to another exemplary embodiment of the present invention.

FIG. 4 is a cross-sectional view of a planar type solid oxide fuel cell according to another exemplary embodiment of the present invention.

BEST MODE

The present invention will be described in detail below with reference to the accompanying drawings. Herein, repeated description and the detailed description of a known function and configuration that may make the purpose of the present invention unnecessarily ambiguous will be omitted. Exemplary embodiments of the present invention are provided so that those skilled in the art may completely understand the present invention. Accordingly, the shape, the size, etc., of elements in the figures may be exaggerated for explicit comprehension.

In the specification, unless explicitly described to the contrary, the word "comprise" and variations such as "comprises" or "comprising", will be understood to imply the inclusion of stated elements but not the exclusion of any other elements.

Hereinafter, preferred embodiments will be suggested for better understanding of the present invention. However, the following embodiments are provided only for more easy understanding the present invention, and thus contents of the present invention are not limited thereto.

<Planar Type Solid Oxide Fuel Cell>

FIG. 1 is a cross-sectional view of a planar type solid oxide fuel cell 100 according to an exemplary embodiment of the present invention. FIG. 2 is an exploded perspective view of a planar type solid oxide fuel cell 100 according to an exemplary embodiment of the present invention. The planar type solid oxide fuel cell 100 according to an exemplary embodiment of the present invention will be described in detail with reference to FIGS. 1 and 2.

The planar type solid oxide fuel cell 100 may include a fuel electrode 11 including at least one fuel through hole 1 and air through hole 2, an electrolyte layer 12 located above fuel electrode 11, an air electrode 13 located above the electrolyte layer 12, and a unit cell 10 including an insulating coating layer 14 which coats at least some of a surface of the fuel electrode 11, the fuel through hole 1, and the air through hole 2.

The unit cell 10 is a fuel electrode support-type in which the fuel electrode 11 serves as a support and the electrolyte layer 12 may be configured to have a size equal to or smaller than the fuel electrode 11. A planar type solid oxide fuel cell 100 in which the fuel electrode 11 and the electrolyte layer 12 have the same size will be described below.

In the fuel electrode support-type unit cell 10 according to an exemplary embodiment of the present invention, the electrolyte layer 12 and the air electrode 13 may be formed to have a size smaller than the fuel electrode 11. In this case, the area of the fuel electrode 11 is larger than an area of the air electrode 13 so that a polarization resistance of the fuel electrode 11 may be minimized.

In the fuel electrode support structure, the electrolyte layer 12 may be formed as a thin film having a thickness of 5 to 10 μm so that the sheet resistance of the electrolyte layer 12 may be minimized. Therefore, the solid oxide fuel cell including the fuel electrode support structure may operate at a lower temperature than that of a structure including the electrolyte support and the air electrode support. Further, the fuel electrode 11 and the air electrode 13 are formed to be thick, so that a mechanical strength of the planar type solid oxide fuel cell 100 may be increased.

The fuel through hole 1 and the air through hole 2 formed in the fuel electrode 11 may be formed at an edge of the fuel electrode 11 and two or more fuel through holes 1 or air through holes 2 may be formed in opposite directions. Referring to FIG. 2, two fuel through holes 1 are formed on both left/right surfaces of the electrolyte layer 12 to be opposite to each other and the air through holes 2 may be formed on both upper and lower surfaces of the electrolyte layer 12 to be opposite to each other.

Further, when two or more fuel through holes 1 and two or more air through holes 2, for example, four fuel through holes 1 are formed, two may be formed at a left side of the electrolyte layer 12 and two may be formed at a right side thereof. However, it should be noted that the number, a size, and a shape of fuel through holes 1 and air through holes 2 according to the present invention are not limited thereto.

The fuel through hole 1 and the air through hole 2 formed in the fuel electrode 11 may serve as a passage through which fuel and reaction gas may flow to the planar type solid oxide fuel cell 100 so that the window frame may be omitted. In the planar type solid oxide fuel cell of the related art, the reaction gas flows up and down using a passage formed in the window frame. However, according to the present invention, the passage through which the fuel and the reaction gas flow is formed in the unit cell 10 so that a window frame may be omitted among configurations of the planar type solid oxide fuel cell 100.

Moreover, the window frame is omitted so that a weight of the planar type solid oxide fuel cell 100 is reduced, thereby increasing energy efficiency. Further, a configuration of the planar type solid oxide fuel cell 100 is simplified, so that economic effect such as reduced manufacturing cost may be obtained.

The electrolyte layer 12 generally serves as a separator which separates a positive electrode and a negative electrode in a secondary cell and may also serve as an intermediate mediator which moves ions of the positive electrode and the negative electrode. Therefore, the electrolyte layer 12 may have a dense structure so that the fuel gas and oxidizing gas are not ventilated with each other. Further, generally, the electrolyte layer 12 of the solid oxide fuel cell may be formed using a thermochemically stable metal oxide, and desirably, yttria stabilized zirconia (YSZ) may be used.

Generally, when oxygen is supplied, the air electrode 13 serves to receive electrons from an external circuit to reduce oxygen to oxygen ions. The reduced oxygen ion moves to the fuel electrode 11 through the electrolyte layer 12 to react with the oxidized fuel to generate water. Therefore, the air electrode 13 may have a porous structure so that the electrochemical reaction easily occurs. Moreover, as the air electrode 13, a perovskite material may be used.

The insulating coating layer 14 may prevent reaction gas and air from penetrating into the unit cell 10. The insulating coating layer 14 may be formed by coating a surface of the fuel electrode 11, an inside of the fuel through hole 1, and an inside of the air through hole 2 with an insulating material. It should be noted that when the insulating coating layer 14 is coated in the fuel through hole 1 and the air through hole 2, the insulating coating layer 14 may be coated in form of a ring so as to form a hole through which the reaction gas and the air flow in and out at a center portion.

Moreover, the insulating material may include a non-conductive material. Further, during a dipping process of the planar type solid oxide fuel cell 100, when a volume change of the material is large due to the temperature, a thickness of the planar type solid oxide fuel cell 100 is increased. Therefore, the insulating material may include a material having a low coefficient of thermal expansion.

For example, the insulating material may include any one or more of a zirconia based oxide ($ZrO_2$) doped with Y, Ca, Ni, or Sc, such as yttria stabilized zirconia (YSZ), calcia stabilized zirconia (CSZ), or scandia-stabilized zirconia (SSZ), ceria based oxide ($CeO_2$) doped with Gd, Y, or Sm, such as gadolinia doped ceria (GDC), samarium doped ceria (SDC), yttria doped ceria (YDC), aluminum oxide ($Al_2O_3$), glass, and crystalized glass.

Desirably, the insulating material may include any one or more of yttria stabilized zirconia (hereinafter, abbreviated as YSZ), gadolinium doped cesium oxide (gadolinium stabilized ceria, hereinafter abbreviated as GDC), calcia stabilized zirconia (CaO stabilized $ZrO_2$, hereinafter, abbreviated as CSZ), aluminum oxide ($Al_2O_3$), glass, and crystalized glass.

The YSZ is a ceramic material produced by adding yttrium oxide (yttria) to zirconium oxide (zirconia) to be stable at a room temperature. The YSZ is a composition, which is widely used as a material for forming the fuel electrode 11 or the electrolyte layer 12 of the solid oxide fuel cell 100, and has excellent oxygen ion conductivity and electrical insulation and is operated at a high temperature.

The GDC is a composition used as the fuel electrode 11 of the solid oxide fuel cell 100, has high ion conductivity and increases a carbon coating resistance to improve a performance of the unit cell 10 and may perform internal reformation of a hydrocarbon fuel.

The CSZ is a ceramic material produced by adding calcium oxide (calcia) to zirconium oxide (zirconia) to be stable at a room temperature. Calcia is added to improve thermal stability of zirconia. The CSZ is a status in which a cubic crystal structure and a tetragonal crystal structure are mixed. The tetragonal crystal structure is changed to a cubic crystal structure according to temperature rising and changed to a tetragonal crystal structure according to temperature falling. The volume may repeatedly expand and contract during the process of changing the crystal structure. Further, the CSZ has low conductivity and also have a porous structure to have high gas permeability and excellent compressive strength.

The glass and crystalized glass are generally a composition which forms a sealant layer in the solid oxide fuel cell 100. The unit cell 10 and the sealant layer are formed to have the same composition to increase interface bonding strength.

The insulating material is coated on the fuel electrode 11 so that when the fuel flows in/out through the fuel through hole 1, the fuel is prevented from flowing into the unit cell 10 to be in contact with the reaction gas or hydrogen supplied to the air electrode 13. Further, it should be noted that the coated insulating material may prevent the reaction gas or hydrogen which flows in/out through the air through hole 2 from flowing into the unit cell 10.

The insulating coating layer 14 may be formed by any one of a sputtering method, a SOG method, spin coating, dip coating, spray coating, a droplet discharge method (for example, an inkjet method, screen printing, or offset printing), a doctor knife, a roll coater, a curtain coater, and a knife coater. Desirably, the insulating coating layer 14 may be formed by any one of the dip coating and the spray coating.

The dip coating is a coating method of dipping the fuel electrode 11 or the electrolyte layer 12 in a coating material and then drying the fuel electrode 11 or the electrolyte layer 12 and may be applied to a material which has a complex shape or is inappropriate for the spray coating, or has the same color on both sides.

The spray coating is a method of making a coating material misty by compressed air or squeezing using a sprayer to spray and coat the coating material on a surface to be coated. The coating material is quickly dried so that the spray coating is designed for a coating material which is inappropriate for brush painting.

The insulating coating layer 14 needs to coat an insulating material in a complex shape such as the fuel through hole 1 and the air through hole 2 formed in the fuel electrode 11 according to an exemplary embodiment of the present invention or inner surfaces of a fuel gas passage 3 and an air passage 4 formed in the electrolyte layer 12 according to another exemplary embodiment of the present invention which will be described below. Therefore, deep coating or spray coating is desirable.

FIG. 3 is a cross-sectional view of a planar type solid oxide fuel cell 100' according to another exemplary embodiment of the present invention. In a unit cell 10' according to another exemplary embodiment of the present invention, the fuel electrode 11 and the electrolyte layer 12 have the same size and a fuel gas passage 3 corresponding to the fuel through hole 1 and an air passage 4 corresponding to the air through hole 2 may be formed in the electrolyte layer 12. It should be noted that the fuel gas passage 3 and the air passage 4 may be formed to have a position, a size, and a number, and a shape corresponding to the fuel through hole 1 and the air through hole 2.

Further, an insulating material is coated on at least some of a surface of the electrolyte layer 12, the fuel gas passage 3, and the air passage 4 to form an insulating coating layer 14. That is, the unit cell 10' in which the insulating coating layer 14 is formed below the fuel electrode 11 and above the electrolyte layer 12 may be formed. In this case, a hole having a position, a size, and a shape corresponding to the air electrode 13 is formed in the insulating coating layer 14 formed above the electrolyte layer 12 and the hole may be formed to be spaced apart from the air electrode 13.

Further, the insulating material may include any one or more of yttria stabilized zirconia (hereinafter, abbreviated as YSZ), gadolinium doped cesium oxide (gadolinium stabilized ceria, hereinafter abbreviated as GDC), calcia stabilized zirconia (CaO stabilized $ZrO_2$, hereinafter, abbreviated as CSZ), aluminum oxide ($Al_2O_3$), glass, and crystalized glass.

For example, when the insulating material is one or more of YSZ, GDC, and CSZ, the electrolyte layer 12 and the insulating coating layer 14 formed above the electrolyte layer 12 may be formed by the same composition so that the insulating material may be coated only on the inner surfaces of the fuel through hole 1 and the air through hole 2 and a lower side of the fuel electrode 11.

Therefore, the planar type solid oxide fuel cell 100' including the unit cell 10' according to another exemplary embodiment of the present invention has a high structural stability because as an area on which the insulating material is coated is reduced and the area of the electrolyte layer 12 is increased, no damage or no structural change is caused by an oxidation-reduction cycle.

The planar type solid oxide fuel cell 100 according to an exemplary embodiment of the present invention and the planar type solid oxide fuel cell 100' according to another exemplary embodiment of the present invention may include a sealant layer including an upper sealant 21 which is located above the unit cell 10 or 10' and a lower sealant 22 which is located below the unit cell 10 or 10', an air electrode interconnect 30 which is located above the upper sealant 21 and has at least one air manifold 5 and at least one fuel manifold 6, and a fuel electrode interconnect 40 which is located below the lower sealant 22 and has at least one air manifold 5 and at least one fuel manifold 6.

The sealant layer may be formed of any one of glass and crystalized glass and serves to bond the unit cell 10 and the air electrode interconnect 30 and the fuel electrode interconnect 40. Therefore, the sealant layer may be formed to have a ring shape.

When the fuel electrode 11 and the electrolyte layer 12 have different sizes, the upper sealant layer 21 may bond the insulating coating layer 14 and the air electrode interconnect 30 with each other and the lower sealant layer 22 may bond the insulating coating layer 14 and the fuel electrode interconnect 40 with each other. Therefore, the sealant layer may be formed to have a quadrangular ring shape in which a hole having a position and a size corresponding to the unit cell 10 or 10' is formed.

In the related art, the sealant layer bonds three phases of the interconnect, the electrode, and the window frame so that it is difficult to design a composition of the sealant layer which may bond all three configurations. However, according to the present invention, the insulating coating layer 14 is formed above and below the fuel electrode 11 so that the sealant layer may be designed by a material having excellent bonding strength with the compositions of the insulating coating layer 14 and the fuel electrode/air electrode interconnects 30 and 40. Therefore, economic effect such as reduced cost may be achieved.

The fuel manifolds 5 formed in the air electrode interconnect 30 and the fuel electrode interconnect 40 may be formed in a position corresponding to the fuel through hole 3 formed in the fuel electrode 11 and the fuel gas passage formed in the electrolyte layer 12.

When a plurality of planar type solid oxide fuel cells 100 is laminated to form a stack structure, the air electrode interconnect 30 and the fuel electrode interconnect 40 may serve to electrically connect the plurality of laminated unit cells 10 and form a flow passage so that two types of gas which are supplied to the fuel electrode 11 and the air electrode 13 is uniformly supplied to the unit cell 10 without being mixed.

The flow passage formed in the air electrode interconnect 30 and the fuel electrode interconnect 40 may have an uneven structure and be formed on any one or more of upper surfaces and lower surfaces of the air electrode and fuel electrode interconnects 30 and 40. Moreover, the flow passage formed in the air electrode interconnect 30 and the flow passage formed in the fuel electrode interconnect 40 are formed to be perpendicular to each other so that the flow passages are not in communication with each other. The air is supplied through the flow passage formed in the air electrode interconnect 30 and the fuel gas may be supplied through the flow passage formed in the fuel electrode interconnect 40.

The planar type solid oxide fuel cells 100 and 100' according to the exemplary embodiment of the present invention may further include an air electrode current collector and a fuel electrode current collector. Specifically, the air electrode current collector may be located between the upper sealant 21 and the air electrode interconnect 30 and the fuel electrode current collector may be located between the lower sealant 22 and the fuel electrode interconnect 40.

Generally, the current collector helps the fuel electrode 11 or the air electrode 13 to be in uniformly and electrically contact with the air electrode and fuel electrode interconnects 30 and 40. Further, the air electrode current collector is formed using a porous metal plate, a metal mesh, or a conductive ceramic paste and the fuel electrode current collector is formed mainly using nickel foam.

Since the air electrode and fuel electrode current collectors use the known technology, a detailed description thereof will be omitted.

While the present invention has been described with reference to the preferred embodiments, it will be understood by those skilled in the art that various changes and modifications of the present invention may be made without departing from the spirit and scope of the present disclosure as defined in the following claims.

The invention claimed is:

1. A planar type solid oxide fuel cell, comprising:
   a unit cell which includes:
   a fuel electrode including at least one fuel through hole having a first surface and at least one air through hole having a second surface;
   an electrolyte layer located above the fuel electrode;
   an air electrode located above the electrolyte layer; and
   an insulating layer on a surface of the fuel electrode, the first surface of the at least one fuel through hole, and the second surface of the at least one air through hole,
   wherein in the unit cell, the fuel electrode serves as a support,
   wherein the electrolyte layer and the fuel electrode have a same size,
   wherein the fuel electrode has a width extending from a first edge to a second edge,
   wherein a width of the electrolyte layer is equal to the width of the fuel electrode so that the electrolyte layer does not extend beyond the first edge and the second edge of the fuel electrode,
   wherein a size of the air electrode is smaller than the size of the fuel electrode, and
   wherein the insulating coating layer and the electrolyte layer are formed by a same composition.

2. The planar type solid oxide fuel cell of claim 1, further comprising:
   a sealant layer including an upper sealant located above the unit cell and a lower sealant located below the unit cell;
   an air electrode interconnect which is located above the upper sealant and includes at least one air manifold and at least one fuel manifold; and a fuel electrode interconnect which is located below the lower sealant and includes at least one air manifold and at least one fuel manifold.

3. The planar type solid oxide fuel cell of claim 1, wherein the at least one fuel through hole and the at least one air through hole are formed at an edge of the fuel electrode.

4. The planar type solid oxide fuel cell of claim 1, wherein in the electrolyte layer, a fuel gas passage corresponding to the at least one fuel through hole and an air passage corresponding to the at least one air through hole are formed.

5. The planar type solid oxide fuel cell of claim 4, wherein the insulating layer is coated on the fuel gas passage, and the air passage.

6. The planar type solid oxide fuel cell of claim 1, wherein the insulating layer is coated with an insulating material.

7. The planar type solid oxide fuel cell of claim 6, wherein the insulating material includes any one or more of yttria stabilized zirconia (YSZ), gadolinium doped cesium oxide (gadolinium stabilized ceria, GDC), calcia stabilized zirconia (CaO-stabilized ZrO2, CSZ), aluminum oxide (Al2O3), glass, and crystalized glass.

8. The planar type solid oxide fuel cell of claim 1, wherein the insulating layer is formed by any one of dip coating and spray coating.

9. The planar type solid oxide fuel cell of claim 2, further comprising:
an air electrode current collector between the upper sealant layer and the air electrode interconnect; and
a fuel electrode current collector between the lower sealant layer and the fuel electrode interconnect.

10. The planar type solid oxide fuel cell of claim 1, wherein the insulating layer contacts a bottom surface of the fuel electrode and a top surface of the electrolyte layer.

11. The planar type solid oxide fuel cell of claim 1, wherein the insulating layer contacts the bottom surface of the fuel electrode and the top surface of the fuel electrode.

12. The planar type solid oxide fuel cell of claim 1, wherein the insulating layer extends an entire distance of the at least one fuel through hole between the top surface and the bottom surface of the fuel electrode.

13. The planar type solid oxide fuel cell of claim 12, wherein the insulating layer contacts the bottom surface of the fuel electrode and the top surface of the fuel electrode.

14. The planar type solid oxide fuel cell of claim 1, wherein the insulating layer has a central section and a first end section, the central section covering the first surface of the at least one fuel through hole, and the second surface of the at least one air through hole, and
wherein the central section and the first end section are continuous.

15. The planar type solid oxide fuel cell of claim 14, wherein the insulating layer has a second end section,
wherein the first end section directly contacts a top surface of the fuel electrode and the second end section directly contacts a bottom surface of the fuel electrode, and
wherein the central section, the first end section and the second end section are continuous.

16. The planar type solid oxide fuel cell of claim 15, wherein the fuel electrode is formed of a single material.

17. The planar type solid oxide fuel cell of claim 1, wherein the fuel electrode is formed of a single material.

18. The planar type solid oxide fuel cell of claim 1, wherein the fuel electrode is formed entirely of a ceramic material.

* * * * *